United States Patent [19]

Ruggiero et al.

[11] Patent Number: 5,336,787

[45] Date of Patent: *Aug. 9, 1994

[54] PROCESS OF MAKING SELECTED POLY(DIANHYDRIDES) COMPOUNDS

[75] Inventors: Murray A. Ruggiero, East Haven; Renata C. Stegmeier, Bethany; Bruce A. Marien, Woodbridge, all of Conn.; Keith O. Wilbourn, Floyds Knobs, Ind.

[73] Assignee: Olin Corporation, Stamford, Conn.

[*] Notice: The portion of the term of this patent subsequent to Apr. 27, 2010 has been disclaimed.

[21] Appl. No.: 11,552

[22] Filed: Feb. 1, 1993

Related U.S. Application Data

[63] Continuation-in-part of Ser. No. 808,141, Dec. 16, 1991, Pat. No. 5,206,335.

[51] Int. Cl.$^5$ .................... C07D 307/89; C08G 67/04; C08G 67/00
[52] U.S. Cl. .................... 549/239; 528/206; 528/220; 528/271; 528/360; 528/361; 549/241
[58] Field of Search ............... 549/241, 239; 528/206, 528/220, 271, 360, 361

[56] References Cited

PUBLICATIONS

Ramirez et al., J. Org. Chem., vol. 41 (24), pp. 2909–2914 (1976).

*Primary Examiner*—Bernard Dentz
*Attorney, Agent, or Firm*—William A. Simons

[57] ABSTRACT

A process of making poly(dianhydride) compounds having formulae (I) and (II):

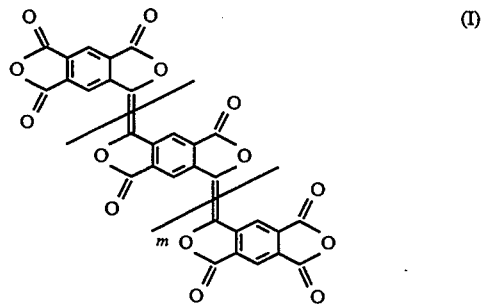

(I)

where m is 0 to 50.

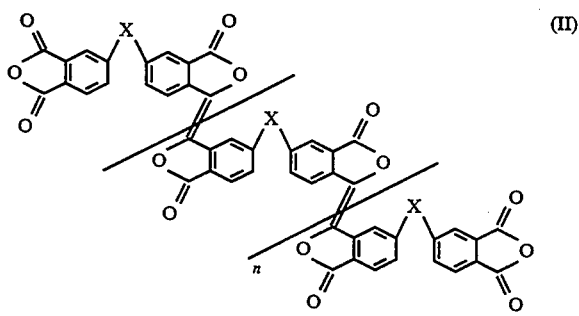

(II)

wherein n is 0 to 20 and X is bond junction, oxygen atom, sulfur atom, $SO_2$, $C(CF_3)$, CO, $C(CH_3)_2$, $CF_2-O-CF_2$, $CH_2$, and CHOH.

23 Claims, No Drawings

PROCESS OF MAKING SELECTED POLY(DIANHYDRIDES) COMPOUNDS

This application is a continuation-in-part application of U.S. Ser. No. 07/808,141, filed Dec. 16, 1991, now U.S. Pat. No. 5,206,335, which issued on Apr. 27, 1993.

BACKGROUND OF THE INVENTION

1. Field of the Invention

The present invention relates to a process of polymerizing certain aromatic dianhydrides to form selected poly(dianhydride) compounds. The present invention also relates to a method of making selected poly(dianhydride) compounds terminated with reactive end groups. The present invention further relates to a process of making selected poly(amic acid) compounds and selected poly(amic acid) compounds terminated with reactive end groups both of which are based on said selected poly(dianhydride) compounds. Still further, the present invention relates to a process of producing selected poly(imide) compounds and selected poly(imide) compounds terminated with reactive end groups, both of which are based on selected poly(dianhydride) compounds. In addition the present invention relates to a method of seperating and purifying the polymer products herein described.

2. Brief Description of Related Art

Dianhydrides are known precursors to many chemical products, including poly(amic acids) and poly(imide) resins. See, for example, C. E. Sroog, *J. Polymer Science*, Macromolecular Reviews, 11, 161 (1976). Known dianhydrides include 1,2,4,5-benzene tetracarboxylic dianhydride (CAS No. 89-32-7) also known as pyromellitic dianhydride (PMDA) which has formula (A):

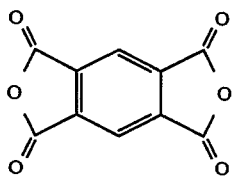

Other known dianhydrides include those in the general formula (B):

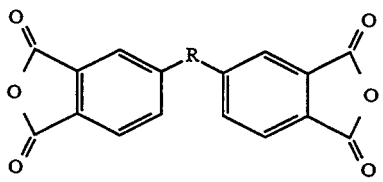

wherein R is an organic or inorganic linking group.

It is known to react dianhydrides with epoxides to form thermoset systems. It is also known to react dianhydrides with diamines to form poly(amic acids). For example, see the Sroog article cited above.

Also, it is known to convert poly(amic acids) into poly(imide) resins. See U.S. Pat. No. 4,480,088 which issued to Pike on Oct. 30, 1984.

It is also known to react poly(imides) with polymerizable end groups having amino functionalities to form poly(imides) terminated with reactive end groups. See, for example, U.S. Pat. No. 3,845,018 which issued to N. Bilow, A. L. Landis, and L. J. Miller on Oct. 29, 1974.

It is also known that poly(imides) and poly(imides) terminated with reactive end groups have utility as adhesives. See, for example, A. K. St. Clair and T. L. St. Clair "The Development of Aerospace Polyimide Adhesives" in *Polyimides*, K. L. Mittal, Ed. Vol. 2, Plenum Press, New York (1984).

It is also known to dimerize anhydrides to form bis-lactones are different in chemical structure from dianhydrides. See F. Ramirez, H. Yomanaka, and O. H. Basedow *Journal of American Chemical. Soc.*, 83, 173 (1961).

There is still a need for better high temperature epoxy systems which can be used as adhesives and composite matrices (e.g., composites used in aerospace applications). It is believed that the poly(dianhydrides) of the present may be suitable curatives for these epoxy systems.

There is also a need for better rigid-rod resin systems (i.e., where the resin structure has limited flexibility) to provide better strength to adhesives and composite matrices. It is believed that the poly(dianhydrides) with reactive end groups of the invention may solve this need for some applications.

There is also a need for resin systems which have a rigid rod portion and a flexible portion to provide both strength and flexibility to adhesives and composite matrices.

There is also a need for poly(imide)-type polymers which are more thermally stable and have more strength than the conventional ones made by dianhydrides and diamines. It is believed that the poly(imides) and poly(imides) with reactive end groups provide better thermal stability and better strength.

BRIEF SUMMARY OF THE INVENTION

Accordingly, the present invention is directed to a method of making poly(dianhydride) compounds having formulae (I) or (II):

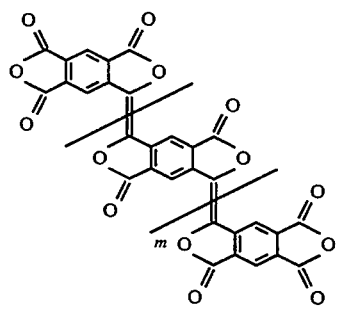

wherein m is 0 to 50; and

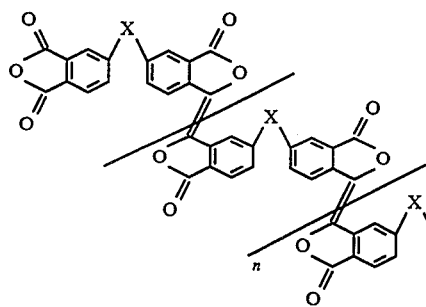

(II)

wherein n is from 0 to 20 and X is selected from the group consisting of bond junctions, oxygen atoms, sulfur atoms, $SO_2$, $C(CF_3)_2$, CO, $C(CH_3)_2$, $CF_2$—O—$CF_2$, $CH_2$, and CHOH. In accordance with this invention the poly(dianhydrides) are produced by polymerizing the corresponding dianhydride precursor.

The present invention is further directed to a process of making poly(dianhydride) compounds terminated with reactive end groups having formulae (III) and (IV):

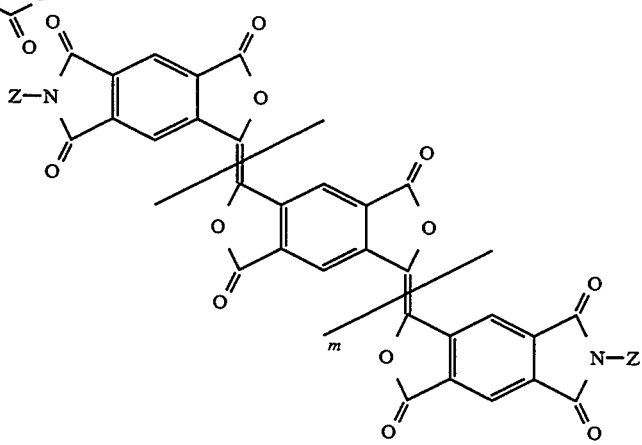

(III)

wherein m is defined as above and Z is selected from the group consisting of benzocyclobutene, a phenylacetylene, a cyclohexeneimide, a 5-norbornene, 2,3 dicarboxylic imide (NADIC), N-propargylimide, and a maleimide; and

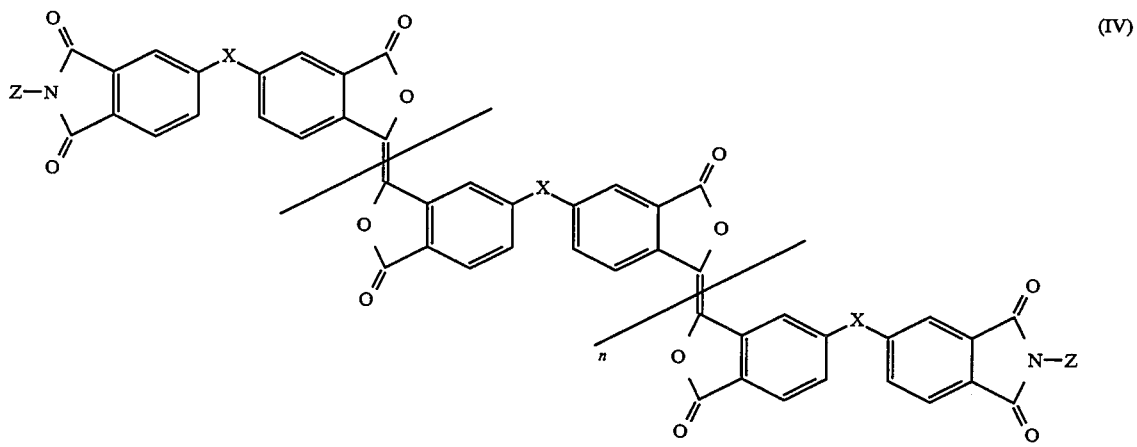

(IV)

wherein X, Z, and n are the same as defined above. These poly(dianhydride) compounds terminated with reactive endgroups are made by reacting an amine with a poly(dianhydride).

The present invention is further directed to a process of making poly(amic acid) compounds by reacting a poly(dianhydride) and a diamine and having either

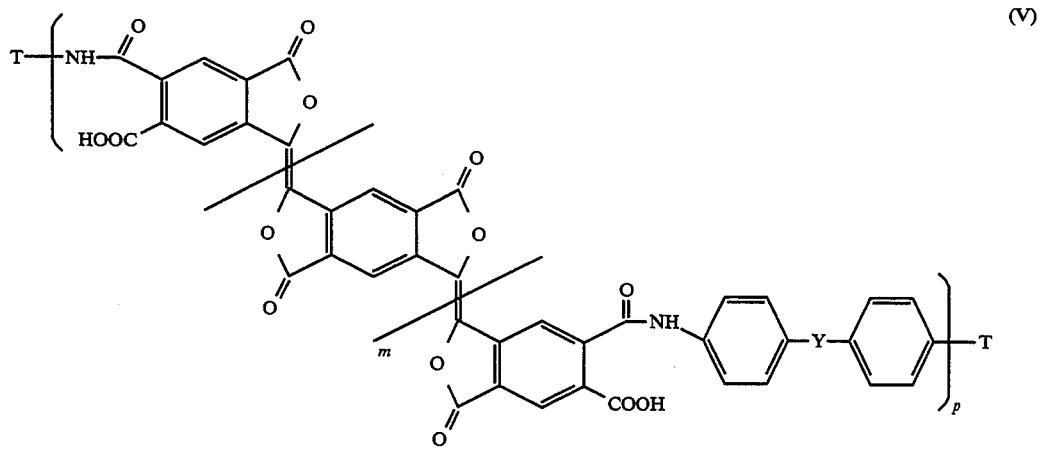

bond to 100 and wherein T is defined as either above-defined poly(dianhydride) or diamine used in this synthesis; and

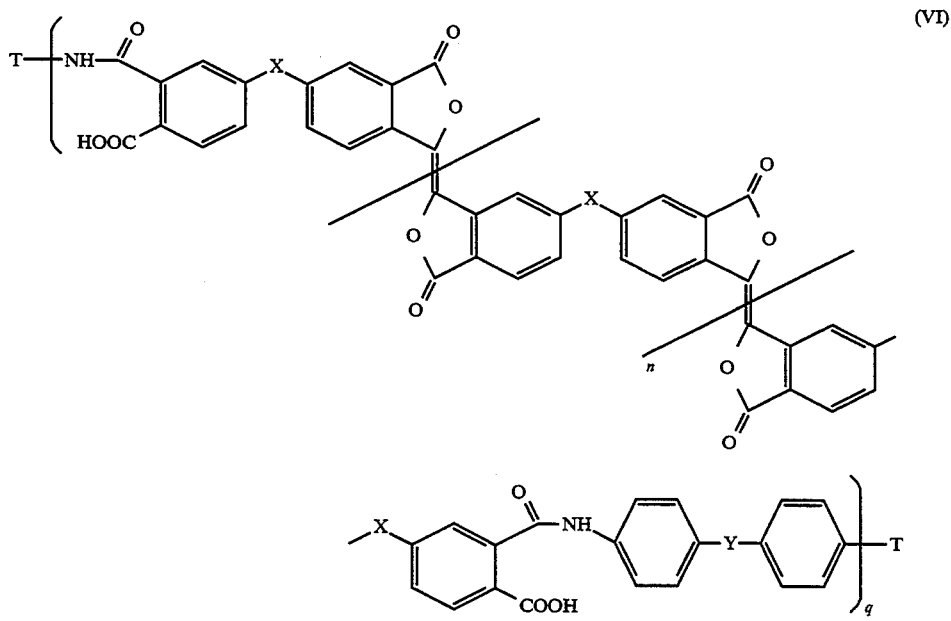

method of making poly(amic acid) compounds terminated with reactive end groups made by reacting a poly(dianhydride) of formulae (I) and (II) with a polyamine to form a poly(amic acid) of formulae (V) and (VI) and then reacting said poly(amic acid) with polymerizable reactive groups. The poly(amic acid) compounds terminated with reactive endgroups are represented by formulae (VII) or (VIII):

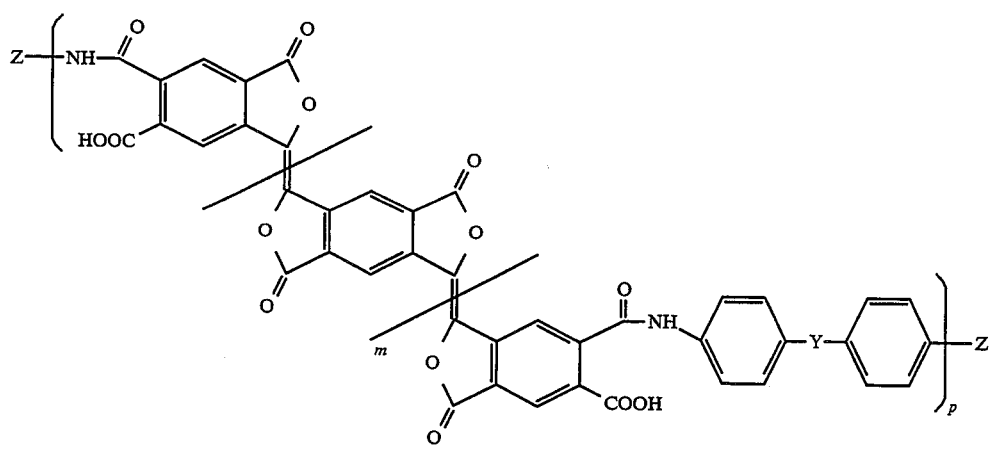

(VII)

wherein m, p, Y, and Z are defined above; and

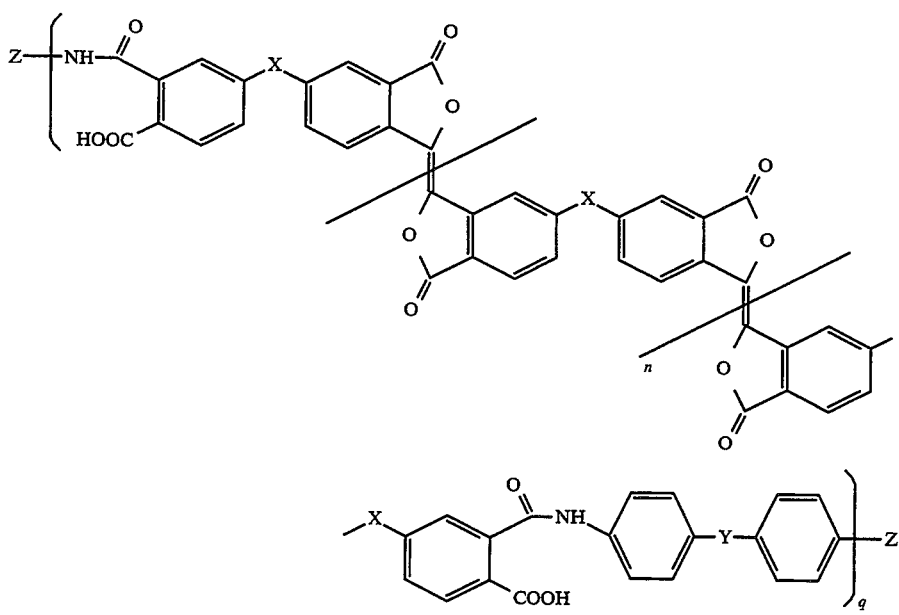

(VIII)

wherein n, q, X, Y, and Z are the same as defined above.

The present invention is further directed to a method of dehydrating (for example thermally or chemically) the above-noted poly(amic acid) compounds having formulae (V) and (VI) to form poly(imide) compounds.

These poly(imide) compounds are represented by formulae (IX) and (X):

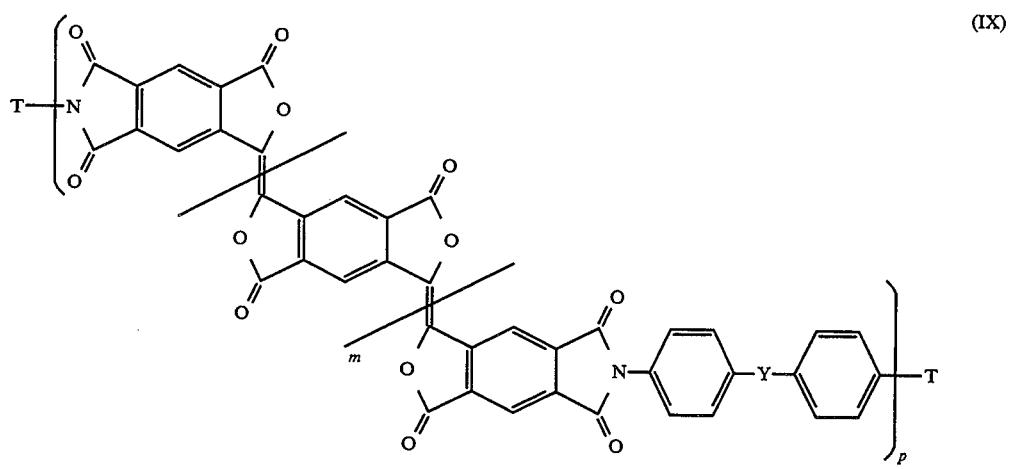

(IX)

wherein m, p, T, and Y are the same as defined above.

comprises heating poly(amic acid) compounds having formulae (V) or (VI). These poly(imides) terminated

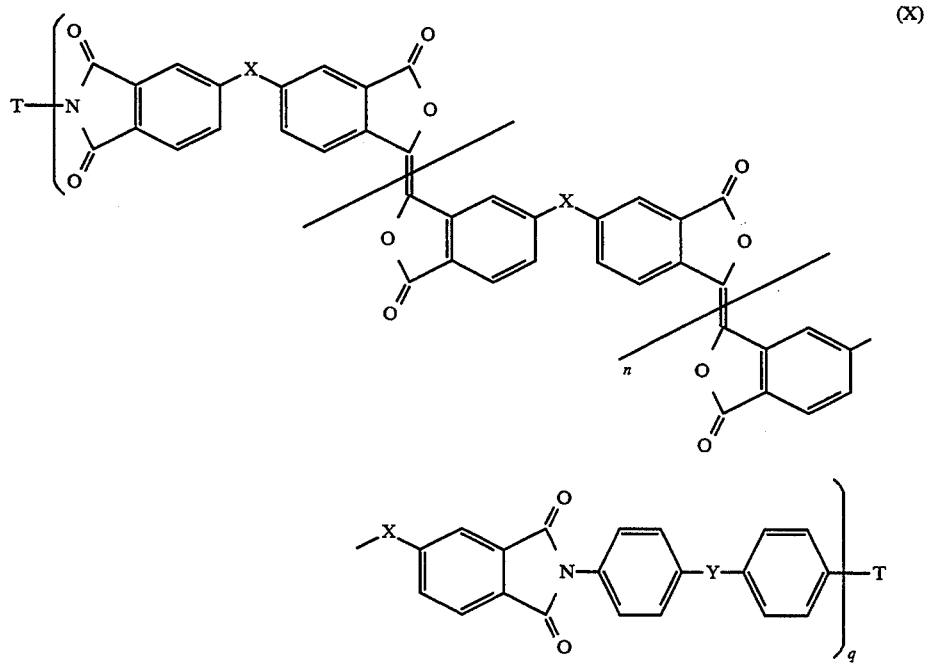

(X)

wherein n, q, T, X, and Y are the same as defined above.

The present invention is further directed to a method of making poly(imides) terminated with reactive end groups having formulae (XI) and (XII). The method with reactive end groups are represented by formulae (XI and XII):

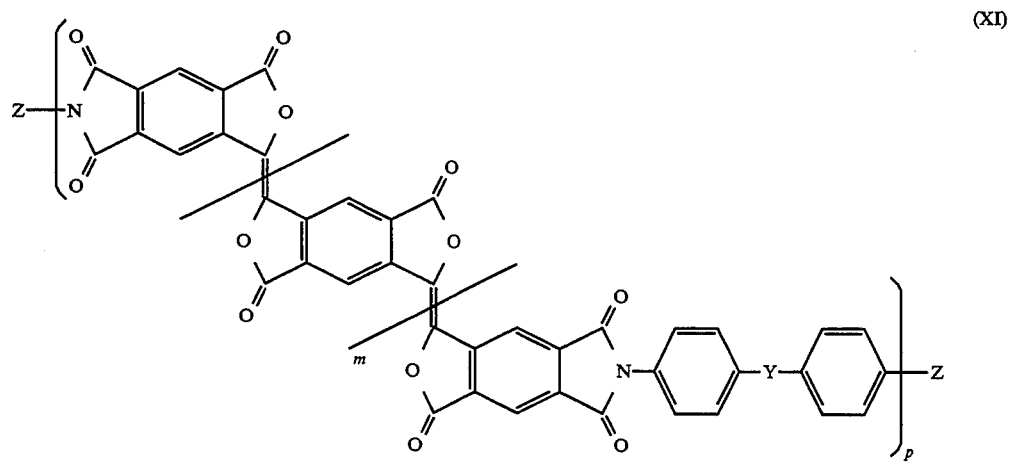

(XI)

wherein m, p, Y, and Z are the same as defined above.

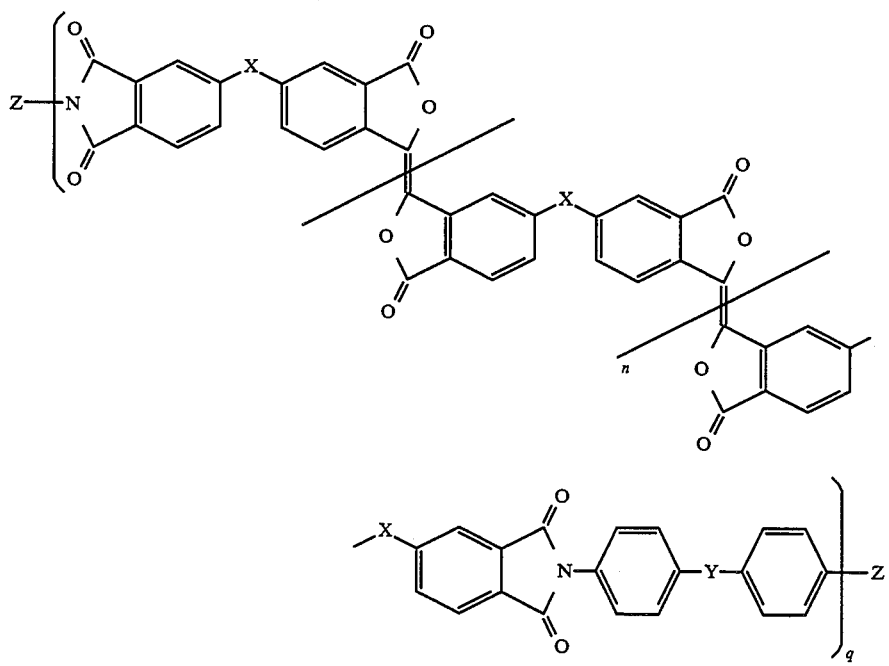

(XII)

wherein n, q, X, Y, and Z are the same as defined above.

This invention is further related to a method of recovering a poly(dianhydride), poly(dianhydride) terminated with reactive end groups, poly(amic acid), poly(amic acid) terminated with reactive end groups, poly(imides) or poly(imide) terminated with reactive endgroups comprising the steps of adding a phase forming solvent to a reaction mixture comprising polymer, original solvent and water formed during polymerization; heating the new reaction mixture containing said phase forming solvent to a temperature sufficient to form a two phase system having an aqueous phase and an organic phase; separating said organic phase from said aqueous phase; and recovering polymer product from said organic phase.

DETAILED DESCRIPTION OF THE INVENTION

The term "poly(dianhydride)" as used herein refers to a compound containing two or more dianhydride moieties which are linked together or an isomeric form thereof e.g., bis(biisocoumarins).

The precursors to the poly(dianhydrides) of the present invention may be any dianhydride which is capable of being polymerized with a polymerizing agent. Preferred precursors include aromatic dianhydrides such as the following:

3,3'4,4'-benzophenone tetracarboxylic dianhydride [CAS No. 2421-28-5] (also referred to herein as BTDA)

3,3'4,4'-diphenylsulfone tetracarboxylic dianhydride [CAS No. 2540-99-0] (also referred to herein as DSDA)

4,4'-oxydiphthalic anhydride [CAS No. 1823-59-2] (also referred to herein as ODPA)

pyromellitic dianhydride (also referred to herein as PMDA)

Conventional polymerizing agents may be used although the preferred class of polymerizing agents are phosphites. The preferred class of phosphites is trialkyl phosphites. The most preferred trialkyl phosphite is triethyl phosphite.

The poly(dianhydrides) of the present invention are generally made by introducing the dianhydride precursor and polymerizing agent into a reaction vessel and heating the reaction mixture sufficiently to cause the desired polymerization.

If a phosphite polymerizing agent is used, it may also act as a solvent for this reaction. This practice is in accordance with the prefferred embodiments of the invention, pursuant to which the molar ratio of dianhydride to phosphite polymerizing agent used ranges from about 1:2 to about 1:100, more preferably from about 1:30 to about 1:60.

The polymerizing reaction is generally carried out at an elevated temperature sufficient to effectuate the polymerization reaction. The elevated temperature is preferably in the range from about 100° C. to about 250° C., more preferably, from about 120° C. to about 180° C. The reaction is preferably carried out under atmospheric pressure, although super- and subatmospheric pressures may be used.

This polymerization reaction may occur in the presence of an additional solvent. Any polar, high boiling organic solvent capable of dissolving the dianhydride precursors may be employed. Xylene and dichlorobenzene are preferred solvents. However, it is most preferred to employ excess polymerizing agent (e.g. triethyl phosphite) in an amount to serve as both a solvent and polymerizing agent.

Generally, it is preferred to carry out this polymerization reaction under an inert atmosphere. The preferred inert atmosphere is either a dry nitrogen or a dry argon atmosphere. The polymerization reaction may be carried out in standard chemical reacting vessels which allow heating and the use of an inert atmosphere blanket.

As recovery and purification steps for the poly(dianhydride), it is preferred to use any standard solid-from-liquid filtration apparatus followed by washing with methanol to remove solvent. The preferred filtration means is vacuum filtration.

Poly(dianhydrides) of formulae (I) and (II) which may be made according to this polymerization reaction include the following:
Homopolymers of bis(4,4'-diphthalic anhydride) ethers
Homopolymers of bis(4,4'-diphthalic anhydride) sulfones
Homopolymers of bis(4,4'-diphthalic anhydride) ketones
Poly(biphthalyl) ethers
Poly(biphthalyl) sulfones
Poly(biphthalyl) ketones
Poly(4,4'-oxydiphthalic anhydride)
Poly(3,3'4,4'diphenylsulfone tetracarboxylic dianhydride)

The poly(dianhydrides) of the present invention may be used as curatives for epoxy resins.

The poly(dianhydrides) of the present invention may be reacted with a primary amine compound having a reactive group to produce the poly(dianhydride) terminated with reactive end groups as represented by formulae (III) and (IV).

The primary amine compound used as a precursor for compounds of formulae (III) and (IV) is denoted generically as $H_2N-Z$, wherein Z is defined as above. The preferred chemical classes of Z include the following:

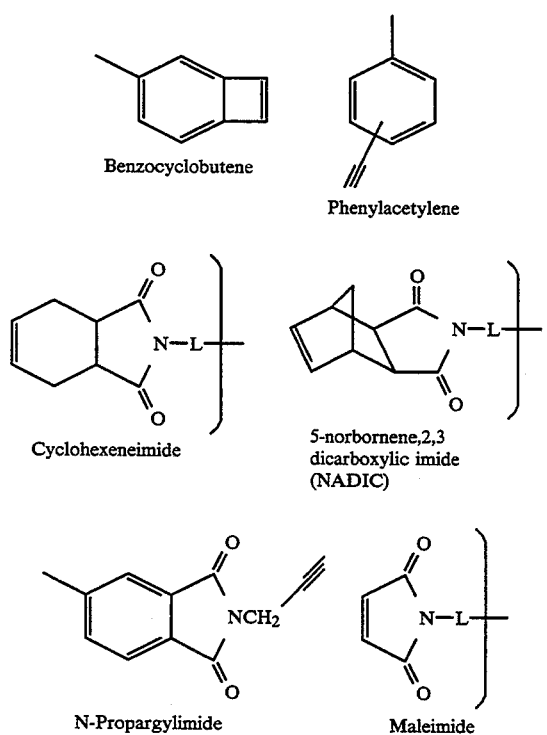

wherein L = $CH_2$, $CH_2CH_2$, dimethyl siloxane,

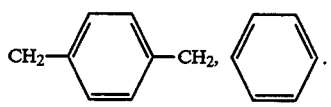

The most preferred primary amine precursors are propargylamine (CAS No. 2540-71-7), aminophenyl acetylene (CAS No. 54060-30-9); and 4-aminobenzocyclobutene.

The poly(dianhydride) and the primary amino precursor are preferably reacted together in the presence of a solvent or mixture of solvents. Any suitable solvent(s) may be used. The preferred solvents include either N,N'-dimethyl-acetamide, 1-methyl-2-pyrrolidinone, and N,N'-dimethyl formamide alone. The elevated temperature can be in the range of from about 100° C. to about 200° C., preferably to about 110° C. to about 185° C. The reaction pressure is generally preferred to be atmospheric; although super-atmospheric and subatmospheric pressures may be used.

The molar ratio of poly(dianhydride) to primary amine can vary widely but preferably is from about 1:2 to about 1:6, most preferably about 1:4.

The reaction is preferably carried out under an inert atmosphere such as dry nitrogen or dry argon. The most preferred atmosphere is a dry argon atmosphere. Any standard chemical reacting vessel which allows for heating and for the use of a dry inert atmosphere may be used herein.

Any standard recovery and purification steps for this product may be employed. The preferred recovery and purification steps for these poly(dianhydrides) terminated with reactive end groups involve the vacuum evaporation of the solvent away from the product followed by slowly introducing the mother liquor into water and then employing a standard solid-from-liquid filtration step, most preferably, vacuum filtration.

The most preferred recovery and purification steps involve the addition of a phase forming solvent to the reaction mixture containing original solvent, poly(dianhydrides) terminated with reactive end groups, and water formed during the polymerization reaction. As used throughout the specification and claims herein, the term "phase forming solvent" is intended to mean and define an organic solvent which (a) is miscible in both water and the original solvent used when endcapping the poly(dianhydrides), (b) has a boiling point between 100° C. and the boiling point of the solvent used in the reactive endcapping of the poly(dianhydride) compounds, and (c) will be capable of developing a two phase system upon addition to the reaction mixture and heating. The most preferred phase forming solvent is 1-cyclohexyl-2-pyrrolidinone.

After addition of the second solvent to the reaction mixture containing original solvent, product and water, the mixture is heated to an elevated temperature. The preferred temperature range is from about 140° C. to about 185° C. The mixture is maintained at said elevated temperature for a time sufficient to bring about the formation of a two phase system. A preferred time range is from about 2 hours to about 3 hours. The polymer may then be recovered from the organic phase by any standard recovery and purification technique.

Several illustrative compounds of formulae (III) and (IV), above, include the following:
Propargyl terminated poly(ODPA)
Propargyl terminated poly(DSDA)
Propargyl terminated poly(BTDA)
Phenyl Acetylene terminated poly(ODPA)
Phenyl Acetylene terminated poly(DSDA)
Phenyl Acetylene terminated poly(BTDA)

The poly(dianhydrides) terminated with reactive end groups of formulae (III) and (IV) may be used in formulations for adhesives, dielectrics, and composite matrices.

The poly(dianhydrides) of formulae (I) and (II) may also be converted into novel poly(amic acids).

This reaction encompasses the reaction of poly(dianhydrides) of formulae (I) and (II) with a polyamine, preferably an aromatic diamine to form compounds represented by formulae (V) and (VI). The preferred diamines are aromatic diamines such as p-phenylenediamine, 2,2'-bis(4-aminophenyl) hexafluoropropane, 2,2'-bis(4-aminophenyl) methane, 2,2'-bis[4-(4'-aminophenoxy)phenyl] hexafluoropropane, 4,4'-oxydianiline, 4,4'-diamino diphenylsulfone (referred to herein as DADS), amine-terminated poly(dimethyl) siloxane, amine-terminated poly(diphenyl) siloxane, and 4,4'oxydianiline or 4-aminophenylether [CAS No. 101-80-4] (also referred to herein as ODA).

This reaction is generally carried out at room temperature and atmospheric pressure in the presence of a solvent.

Furthermore, the reaction is preferably carried out under an inert atmosphere such as dry nitrogen or dry argon. Any standard chemical reaction vessel may be used which allows for stirring and for the use of an inert atmosphere.

The mole ratio of the poly(dianhydride) to the aromatic diamine can vary widely but preferably is from about 1:1 to about 1:1.4. Most preferably, the mole ratio is from about 1:1.1 to about 1:1.3.

The preferred solvents for this reaction include N,N'-dimethylacetamide, N,N'-dimethylformamide, 1-methyl-2-pyrrolidinone, and ethyl lactate. The most preferred are 1-methyl-2-pyrrolidinone and ethyl lactate.

Any conventional recovery and purification steps may be used for these poly(amic acids).

Illustrative poly(amic acids) of formulae (V) and (VI) include the following:

Poly(amic acid) of poly(4,4'-oxydiphthalic anhydride and 4,4'-diamino diphenylsulfone;

Poly(amic acid) of poly(3,3'4,4'-diphenylsulfone tetracarboxylic dianhydride) and 2,2'-bis(4-aminophenyl) hexafluoropropane; and Polyamic acid of poly(3,3',4,4'-benzophenone tetracarboxylic dianhydride) and 2,2'-bis(4-aminophenyl) hexafluoropropane.

The poly(amic acids) for formulae (V) and (VI) may be used in formulations for adhesives, dielectrics, and composite matrices.

The poly(amic acids) of the present invention may be reacted with a primary amine having a reactive group to produce a poly(amic acid) terminated with a reactive end group of formulae (VII) or (VIII).

The primary amine compound used as a precursor for compounds of formulae (VII) and (VIII) is denoted generically as $H_2N-Z$, wherein Z is defined as above.

The preferred reactive amino end group precursors are propargylamine (CAS No. 2540-71-7), 4-aminophenyl acetylene (CAS No. 54060-30-9); and 4-aminobenzocyclobutene.

The poly(amic acid) and primary amine precursor are preferably reacted together in the presence of a solvent or mixture of solvents. The preferred solvents include either N,N'-dimethylacetamide, 1-methyl-2-pyrrolidinone, and N,N'-dimethyl formamide alone.

Generally, it is preferred to add sufficient solvent to dissolve the poly(amic acid) reactant. The preferred amount of solvent is such that there is about 0.01 to about 0.05 moles poly(amic acid) reactant per liter of solvent.

The reactants are heated to an elevated temperature sufficient to effectuate the reaction. The elevated temperature is generally from about 100° C. to about 200° C., preferably from about 110° C. to about 185° C. The reaction pressure is generally preferred to be atmospheric; although super-atmospheric and subatmospheric pressures may be used.

While the the mole ratio of the poly(amic acid) precursor to the primary amine compound can vary widely a preferable ratio is from about 1:2 to about 1:6, more preferably about 1:4.

The reaction is generally carried out for a time sufficient to produce good yield and little shrinkage. A preferred time range is from about 24 hours to about 96 hours. It has been found that reactions allowed to proceed for 96 hours produce product having better yield and less shrinkage.

The reaction is preferably carried out under an inert atmosphere such as dry nitrogen or dry argon. The most preferred atmosphere is a dry argon atmosphere. Any standard chemical reacting vessel which allows for heating and for the use of a dry inert atmosphere may be used herein.

Any standard recovery and purification steps for this product may be employed. One preferred recovery and purification technique for these poly(amic acids) terminated with reactive amino end groups involves the vacuum evaporation of the solvent away from the product followed by slowly introducing the mother liquor into water and then employing a standard solid from liquid filtration step, most preferably, vacuum filtration.

The most preferred recovery and purification steps involve the addition of a phase forming solvent to the reaction mixture containing original solvent, poly(amic acids) terminated with reactive end groups, and water formed during the polymerization reaction. The most preferred phase solvent is 1-cyclohexyl-2-pyrrolidinone.

After addition of the phase forming solvent to the reaction mixture containing original solvent, product and water, the mixture is heated to an elevated temperature. The preferred temperature range is from about 140 degrees Celcius to about 185 degrees Celcius. The mixture is maintained at said elevated temperature for 2-3 hours. During this time a two phase system develops and the aqueous phase evaporates into an inert atmosphere of nitrogen or argon. The polymer may then be recovered from the organic phase by the preferred recovery and purification steps for poly(amic acids) terminated with reactive end groups stated above.

Several illustrative compounds of formulae (VII) and (VIII), above, include the following:
Phenylacetylene Terminated [(Poly ODPA).ODA]
Phenylacetylene Terminated [(Poly BTDA).ODA]
Phenylacetylene Terminated [(Poly DSDA).ODA]
Propargyl Terminated [(Poly ODPA).DADS]
Propargyl Terminated [(Poly BTPA).DADS]
Propargyl Terminated [(Poly DSDA).DADS]

The poly(amic acids) having terminated with reactive end groups of formulae (VII) and (VIII) may be used in formulations for adhesives, dielectrics, and composite matrices.

The above-noted poly(amic acids) of formulae (V) and (VI) may be converted into novel poly(imide) compounds of formulae (IX) and (X) by subjecting them to either chemical imidization or elevated temperatures in the presence of a solvent. Preferably, this reaction is carried out at atmospheric pressure under an inert gas atmosphere (e.g., dry nitrogen or dry argon). Any standard film casting apparatus which allows for thermal curing of the precursor poly(amic acids) and for removal of the carrier solvents may be used.

A preferred cure schedule for making these poly(imides) is to cure the poly(amic acids) for one hour at 150° C. followed by curing for two hours at 250° C.

Preferred carrier solvents for this reaction include N,N'-dimethylacetamide, N,N'-dimethylformamide, 1-methyl-2-pyrrolidinone, and ethyl lactate. The most preferred solvents are 1-methyl-2-pyrrolidinone and ethyl lactate.

Illustrative poly(imides) of formulae (IX) and (X) include the following:

Poly[hexafluoropropyl diphenyl poly(3,3'4,4'-diphenylsulfone dianhydride)]

Poly[hexafluoropropyl diphenyl poly(3,3'4,4'-benzophenone dianhydride)]

Poly[oxydiphenyl poly(3,3'4,4'-benzophenone dianhydride)]

Polyimide of poly(3,3',4,4'-benzophenone tetracarboxylic dianhydride) and 2,2'-bis(4-aminophenyl) hexafluoropropane Polyimide of poly(3,3',4,4'-diphenylsulfone tetracarboxylic dianhydride) and 2,2'-bis(4-aminophenyl) hexafluoropropane Polyimide of poly(3,3',4,4'4-benzophenone tetracarboxylic dianhydride) and 4,4'-oxydianiline The poly(imides) for formulae (IX) and (X) may be ingredients in adhesives, dielectrics, and composite matrice compositions.

The above-noted poly(amic acids) having reactive end groups of formulae (VII) and (VIII) may be converted into novel poly(imide) compounds having reactive end groups of formulae (XI) and (XII).

Illustrative poly(imides) of formula (XI) and (XII) include the following:

Phenyl Acetylene Terminated [Poly(PMDA).ODA] Polyimide

Phenyl Acetylene Terminated [Poly(ODPA).ODA] Polyimide

Phenyl Acetylene Terminated [Poly(BTDA).ODA] Polyimide

Propargyl Terminated [Poly(PMDA).DADS] Polyimide

Propargyl Terminated [Poly(OSDA).DADS] Polyimide

Propargyl Terminated [Poly(ODPA).DADS] Polyimide

These poly(imide) compounds having reactive end groups of formulae (XI) and (XII) may be ingredients in adhesives, dielectrics, and composite matrix compositions.

The following Examples are provided to further illustrate the present invention. All parts and percentages are by weight and all temperatures are by degrees Celsius, unless explicitly stated otherwise.

EXAMPLE 1

Synthesis of Poly(oxydiphthalic Anhydride)

A 1,000 ml 3-necked round bottom flask fitted with an overhead mechanical stirrer and a condenser was charged with triethyl phosphite (581 grams, 3.50 moles). This compound was then deoxygenated with dry argon for 20 mins. To this solution was added 4,4'oxydiphthalic anhydride (ODPA) (31.0 grams, 0.10 moles); the solution was then heated to reflux under argon (approximately 135° C.) for 24 hours. An orange precipitate formed on the sides of the flask and on the stirring rod. The mixture was cooled to 0° C. and the material was collected via vacuum filtration, washed with 500 ml of cold methanol, and dried overnight at 80° C. to yield 22.96 g or product. Characteristic IR peaks: 1,776, 1,018 cm$^{-1}$. Gel permeation chromatography showed $M_n=1,870$, $M_w=2,445$.

EXAMPLE 2

Synthesis of Poly(3,3'4,4'-Benzophenone Tetracarboxylic Dianhydride)

The same reaction as above was carried out, except (3,3',4,4'-benzophenone tetracarboxylic dianhydride) (32.2 grams, 0.10 moles) was substituted for ODPA. These reactants were refluxed for 12 hours. Again, an orange material precipitated, was vacuum filtered, and washed with methanol to yield 30.80 grams of an orange-yellow solid. Characteristic IR peaks: 1,785, 1,017 cm$^{-1}$. Gel permeation chromatography showed $M_n=3,569$, $M_w=10,682$.

EXAMPLE 3

Reactive End Capping of Poly(4,4'-Oxydiphthalic Anhydride)

A 500 ml glass round bottom flask was fitted with a condenser and overhead mechanical stirrer. This flask was charged with dimethyl acetamide (40 ml) and poly(4,4'-oxydiphthalic anhydride) (13.7 grams, $M_w=2,445$). This mixture was warmed to 50° C. and stirred until all materials were dissolved. At this time, m-aminophenyl acetylene (2.4 grams, 0.0205 moles) was added and the reaction temperature was raised to 135° C. This was followed by the addition of molecular sieves, 4A. Then the mixture was held at 165° C. for 24 hours. The molecular sieves were then removed by filtration through a Celite Pad.

After cooling the reaction mixture, the remaining materials were dropped very slowly into quickly stirred water to precipitate solids. The materials were collected via vacuum filtration on a fritted glass filter. The product was dried overnight in a 100° C. oven. The material remaining was a brown powder (15.11 grams) with a melting range of 135°–150° C., (IR peaks, cm$^{-1}$ 3,446, 2,160, 1,777, 1,718, 790)

EXAMPLE 4

Reactive End Capping of Poly(3,3',4,4'-Benzophenone Tetracarboxylic Dianhydride)

The same reaction, as above, was carried out, except poly(3,3',4,4 '-benzophenone tetracarboxylic dianhydride) (10 grams, $M_w=4,224$) was substituted for poly(4,4'-oxydiphthalic anhydride). An orange-brown powder (9.01 grams) with a melting range of 165°–177° C. was recovered (IR, cm$^{-1}$ 3,285, 1,768, 1,720, 1,660, 741, 683).

EXAMPLE 5

Synthesis of Poly(amic acids) from Poly(dianhydrides)

In a 500 ml round bottom flask, 1-methyl 2-pyrrolidinone (250 ml) was sparged with dry argon for 20 minutes. After sparging, poly(BPDA) (25 g. $M_w=1,080$) prepared by the above method was introduced and dissolved with magnetic stirring. At this point, oxydianiline (4.63 grams, 0.023 moles) was introduced and the solution was stirred for 24 hours at room temperature under dry argon.

EXAMPLE 6

Synthesis of Poly(imides) from Poly(amic acid) Solutions

To convert poly(amic acids) produced above to poly(imide) systems, the mixture can be cast into film form on a suitable substrate (for example, Teflon coated foil). At this point, the solution can be cured either in atmospheric pressure argon or in a vacuum to remove the solvent. Temperatures for this cure can range from 100° to 250° depending upon pressure. After 2–5 hours of cure, the resulting polyimide can be recovered from the surface of the foil.

EXAMPLE 7

Synthesis of Poly(amic acids) Terminated with Reactive End Groups

Termination of poly(amic acids) with reactive end groups was accomplished using the amic acid preparation from above with a slight modification in ratios of poly(dianhydride) to aromatic diamine, such as oxydianiline. Instead of the 1:1 molar ratio, the concentration of the aromatic diamine should be added so the ratio is 0.9:1 aromatic diamine:poly(dianhydride), for example oxydianiline (4.17 grams, 0.021 moles):poly (BPDA) (25 grams $M_w=1,080$) in 250 ml of 1-methyl 2-pyrrolidinone sparged with argon. These reactants were stirred for 24 hours at room temperature as above. At the end of 24 hours, a reactive end group, such as aminophenyl acetylene (2.4 grams, 020 moles) was added and stirred at room temperature for 8 hours. At this point, the amic acid terminated with reactive end groups is synthesized. There are various means for adjusting the lengths of the poly(amic acid) segments.

EXAMPLE 8

Synthesis of Poly(imide) Terminated with Reactive End Groups

Poly(imides) with reactive end groups are synthesized from the poly(amic acids) with reactive end groups made in the previous sample. These amic acids in 250 ml of 1-methyl 2-pyrrolidinone are heated for 24 hours at 165° C. to convert amic acids to imides. At this point, the poly(imides) can then be precipitated by pouring the mixture into stirring methanol. After precipitation, the poly(imide) can be collected on a fritted glass funnel and dried in a vacuum oven.

EXAMPLE 9

Reactive End Capping of Poly(4,4'-Oxydiphthalic Anhydride)

A 500 ml glass round bottom flask was fitted with a condenser and overhead mechanical stirrer. This flask was charged with 1 Methyl 2 Pyrrolidinone (200 ml) and (4.6 grams) m-aminophenyl acetylene. This mixture was warmed to 60° C. and stirred while adding poly(4,4'-oxydiphthalic anhydride) (25 grams, $M_w=1,398$) incrementally to the m-aminophenyl acetylene solution. This procedure helps minimize possible competing reactions, such as hydrolysis of dianhydride with water present in the reaction system. Then the mixture was held at 165° C.–185° C. for 24 hours. After completion of the reaction, the agent 1 cyclohexyl-2-pyrrolidinone was used to strip off the water generated in the subsequent imidization process, by developing a two phase system, Aqueous Phase and polymer phase solution at temperature of 140° C.–185° C. for 3–4 hours the aqueous phase flash off. The polyamic acid solution was composed of 10% solids, 80% NMP and 10% CHP. The reaction temperature was controlled via a (Therm-o-Watch 17-1100B) with a thermometer immersed in the reaction medium.

After cooling the reaction mixture, the remaining materials were dropped very slowly into quickly stirred methanol to precipitate solids. The materials were collected via vacuum filtration on a fritted glass filter. The product was dried overnight in a 75° C. vacuum oven. The material remaining was a brown powder (28.54 grams) with a melting range of 185°–250° C., (IR peaks, $cm^{-1}$ 3,448, 2,290, 1,779, 1,722, 744).

EXAMPLE 10

Reactive End Capping of Poly(3,3'4,4'-Benzophenone Tetracarboxylic Dianhydride)

The same reaction, as above, was carried out, except poly(3,3',4,4'-benzophenone tetracarboxylic dianhydride) 25 grams, $M_w=4,224$) was substituted for poly(4,4'-oxydiphthalic anhydride). An orange-brown powder (26.17 grams) with a melting range of 250° C. was recovered (IR, $cm^{-1}$ 3,236, 1,779, 1,719, 1,666, 740, 683).

EXAMPLE 11

Synthesis of Poly(imide) Terminated with Reactive End Groups

Poly(imides) with reactive end groups are synthesized from the poly(amic acids) with reactive end groups made in the previous sample. These amic acids in 250 ml of 1-methyl 2-pyrrolidinone are heated for 24 hours at 165° C. to convert amic acids to imides. After completion of the reaction, the agent 1 cyclohexyl-2-pyrrolidinone was used to strip off the water generated in the subsequent imidization process, by developing a two phase system, Aqueous Phase and polymer phase solution at temperature of 140° C.–185° C. for 3–4 hours the aqueous phase flash off. The polyamic acid solution was composed of 10% solids, 80% NMP and 10% CHP. The reaction temperature was controlled via a (Therm-o-Watch 17-1100B) with a thermometer immersed in the reaction medium.

After cooling the reaction mixture, the remaining materials were dropped very slowly into quickly stirred methanol to precipitate solids. The materials were collected via vacuum filtration on a fritted glass filter. The product was dried overnight in a 75° C. vacuum oven.

While the invention has been described above with reference to specific embodiments thereof, it is apparent that many changes, modifications, and variations can be made without departing from the inventive concept disclosed herein. Accordingly, it is intended to embrace all such changes, modifications, and variations that fall within the spirit and broad scope of the appended claims. All patent applications, patents, and other publications cited herein are incorporated by reference in their entirety.

What is claimed is:

1. A process of making a poly(dianhydride) having a structure selected from the group consisting of formulae (I) and (II):

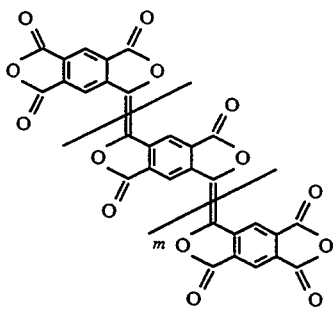

where m is 0 to 50; and

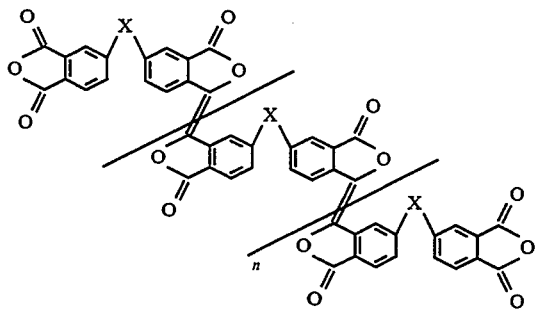

wherein n is from 0 to 20 and X is selected from the group consisting of: bond junction, oxygen atom, sulfur atom, SO₂, C(CF₃)₂, CO, C(CH₃)₂, CF₂—O—CF₂, CH₂, and CHOH, which comprises polymerizing a dianhydride precursor having a structure selected from the group consisting of formulae (A) and (B)

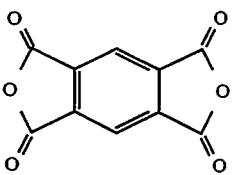

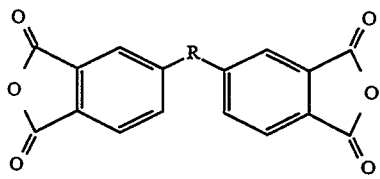

wherein R is the same as X, above.

2. The process according to claim 1 wherein the reaction is carried out in the presence of a solvent.

3. The process according to claim 2 wherein the solvent is polar and has a high boiling point.

4. The process according to claim 3 wherein the solvent is selected from the group consisting of xylene and dichlorobenzene.

5. A process according to claim 1 wherein the dianhydride precursor is selected from the group consisting of 3,3'4,4'-diphenylsulfone tetracarboxylic dianhydride, 3,3',4,4'-benzophenone tetracarboxylic dianhydride, 4,4'-oxydiphthalic dianhydide and pyromellitic dianhydride.

6. A process according to claim 2 wherein an amount of polymerizing agent sufficient to act as both a solvent and polymerizing agent is mixed with the dianhydride precursor prior to polymerization.

7. A process according to claim 6 wherein the polymerizing agent is a phosphite.

8. A process according to claim 7 wherein the phosphite is selected from the class of trialkyl phosphites.

9. A process according to claim 8 wherein the phosphite is triethyl phosphite.

10. A process according to claim 6 wherein a molar ratio of from about 1:2 to about 1:100 of dianhydride is reacted with polymerizing agent.

11. A process according to claim 10 wherein the molar ratio is from about 1:30 to about 1:60.

12. The process according to claim 2 wherein polymerization is carried out in an inert atmosphere.

13. The process according to claim 12 wherein said inert atmosphere comprises dry nitrogen or dry argon.

14. A process according to claim 2 which includes the additional step of reacting said poly(dianhydride) with a primary amine to form a poly(dianhydride) terminated with a reactive end group.

15. A process according to claim 14 wherein the primary amine is selected from the group of propargyl amine, amino phenyl acetylene and 4-aminobenzo cyclobutene.

16. A process according to claim 15 wherein the reaction of poly(dianhydride) and primary amine is carried out in the presence of a solvent or a mixture of solvents.

17. A process according to claim 16 wherein the solvent is selected from the group consisting of N,N'-dimethyl-acetamide, 1-methyl-2-pyrrolidinone and N,N'-dimethyl formamide.

18. A process according to claim 17 wherein from about 0.01 to about 0.05 moles of poly(dianhydride) reactant is used per liter of solvent.

19. A process according to claim 15 wherein the reaction is carried out at a temperature of from about 110° C. to about 185° C.

20. A process of making a poly(dianhydride) having a structure selected from the group consisting of formulae (I) and (II):

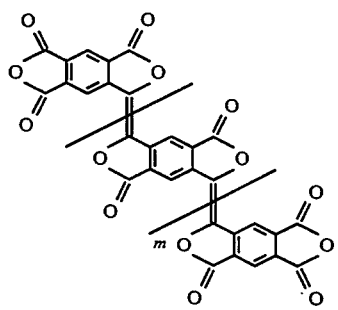

where m is 0 to 50; and

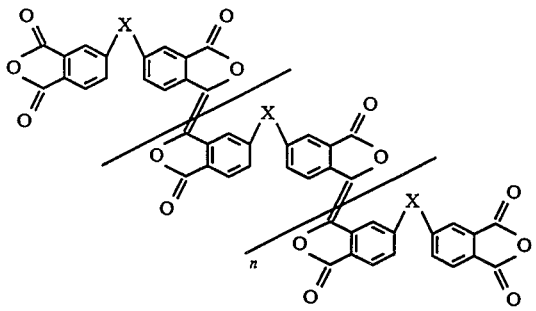

(II)

wherein n is from 0 to 20 and X is selected from the group consisting of: bond junction, oxygen atom, sulfur atom, SO$_2$, C(CF$_3$)$_2$, CO, C(CH$_3$)$_2$, CF$_2$—O—CF$_2$, CH$_2$, and CHOH which comprises mixing a dianhydride precursor having a structure selected from the group consisting of formulae (A) and (B)

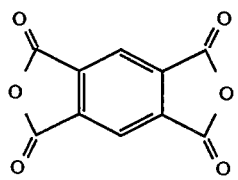
(A)

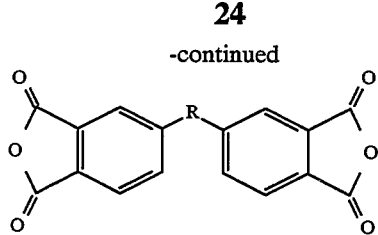
(B)

wherein R is the same as X, above, with a triethyl phosphite and then heating the mixture to a temperature of from about 100 degrees Celcius to about 200 degress Celcius for a period of time from about 24 hours to about 96 hours.

21. A process of recovering a polymer made according to any one of claims 2, 3, 4, 6, 7, 8, 9, 16, 17, 18, and 20 comprising the steps of:
 a) adding a phase forming solvent to a reaction mixture comprising product polymer, original solvent and water formed during polymerization;
 b) heating said new reaction mixture of step (a) to a temperature sufficient to form a two phase system having an aqueous phase and an organic phase;
 c) seperating said organic phase from said aqueous phase; and
 d) recovering polymer product from said organic phase.

22. A process according to claim 21 wherein said phase forming solvent is 1-cyclohexyl-2-pyrrolidinone.

23. A process according to claim 21 wherein step (d) is accomplished by vacuum evaporation of the organic phase followed by adding resulting polymer to water and then separating solid from liquid using filtration.

* * * * *